June 27, 1967 B. I. MILES 3,328,527
SINGLE CONDUCTOR AUDIO FREQUENCY SIGNAL AND D.C. SWITCHING TRANSMISSION SYSTEM
Filed July 24, 1964
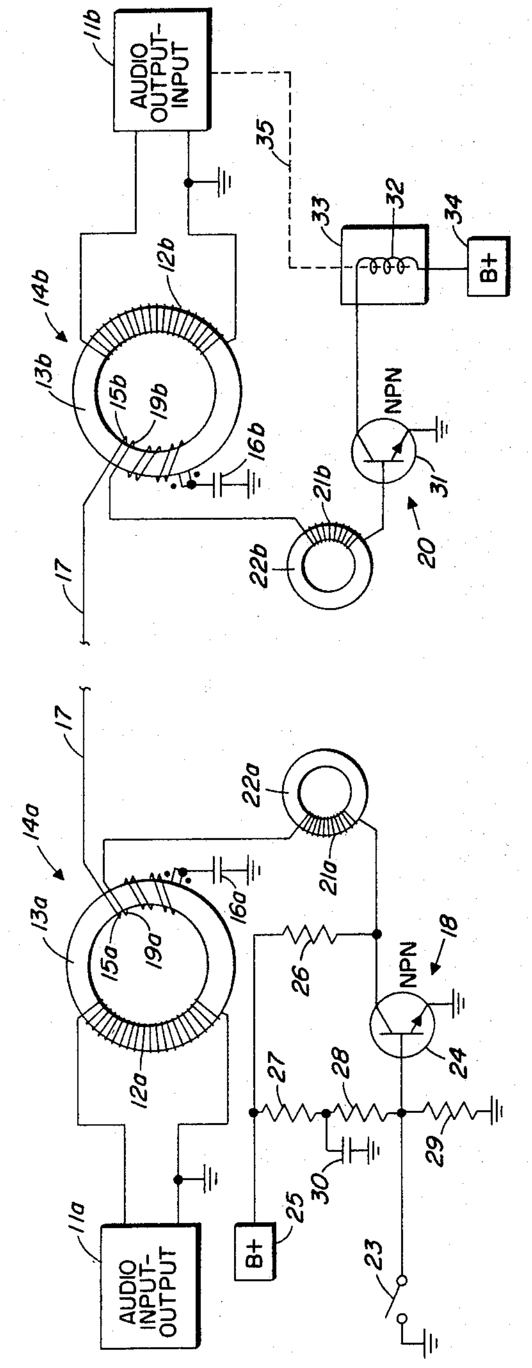
INVENTOR.
BARRY I. MILES
BY Moody and Kintzinger
ATTORNEYS United States Patent Office 3,328,527

Patented June 27, 1967

3,328,527

SINGLE CONDUCTOR AUDIO FREQUENCY SIGNAL AND D.C. SWITCHING TRANSMISSION SYSTEM

Barry I. Miles, Cedar Rapids, Iowa, assignor to Collins Radio Company, Cedar Rapids, Iowa, a corporation of Iowa Filed July 24, 1964, Ser. No. 384,886

8 Claims. (Cl. 179—3)

This invention relates in general to signal combining, conveying, and then signal separating systems, and in particular to system circuitry for combining and then separating a D.C. signal voltage and an audio frequency signal for most economically utilizing a limited number of cable connections between various component locations in the system.

In various electronic equipment installations, for example in many vehicles, particularly military vehicles, including tanks, aircraft, and nautical vessels having multiple electronic component stations, the trend to greater use of electronics and toward more and more sophisticated electronic systems has tended to lead to excessive numerical requirements in cabling circuits.

It is, therefore, a principal object of this invention to combine and then separate D.C. switching current and an audio frequency signal for most economically utilizing a limited number of cable conductors between two electronic component stations in a system.

Another object is to provide substantially mutual isolation between D.C. and audio signal currents in their respective separate input and output circuits to and from a common single transmission line.

A further object is to provide immunity to audio susceptibility interference orginating from any ripple currents that may occur in the D.C. switching current.

Features of this invention useful in accomplishing the above objects include a single conductor transmission line interconnecting two electronic component stations for conveying audio frequency signals in both directions between the stations and, simultaneously, D.C. signal currents between the stations. The transmission line is connected between a transformer coil winding of an audio signal transmitting transformer in one of the stations and a corresponding coil winding in the other station. Each of the electronic component stations also includes a D.C. signal and/or control voltage circuit connected to the single transmission line. These connections to the transmission line each include a coil bifilar wound with the respective audio transmitting-receiving transformer coil so that the same current flow passes through each of the coils bifilar wound in a transformer of each of the stations, and the bifilar wound coils are so polarized that the D.C. current flow of one coil of each bifilar winding is opposite to D.C. current flow in the other companion coil of the same bifilar winding. Each of the two coil bifilar windings is provided, in the respective stations, with an audio frequency current return to ground through a capacitor. A choke coil is also provided between each D.C. signal and/or control voltage circuit and the respective station bifilar coil windings as part of the connection therebetween. The capacitors are so chosen as to have negligible capacitive reactance compared to the inductive reactance of the respective choke coils in order to avoid resonant effects through the audio frequency range. Obviously, audio signal transmitting-receiving transformer coils, provided with the transformers, are connected to audio input/output circuits in each of the stations.

A specific embodiment representing what is presently regarded as the best mode of carrying out the invention is illustrated in the accompanying drawing.

Referring to the drawing:

The single conductor audio frequency signal and D.C. switching transmission system 10 is shown to have an audio input/output circuit 11*a* capable of impressing an audio signal across coil 12*a* with, for example, a 3 volts peak value. Coil 12*a*, wound as an input coil on tape wound toroid transformer core 13*a*, can also act as an output coil for an audio signal flowing the other way in feeding such an audio signal as an output to audio input/output circuit 11*a*.

When coil 12*a* is used as a signal input primary coil of transformer 14*a*, coil 15*a* is the audio signal secondary coil and has a current return to ground from one end through capacitor 16*a*. Coil 15*a* also has a connection from the other end through single conductor transmission line 17 to an end of coil 15*b* of transformer 14*b*. The other end of coil 15*b* has a current return to ground through capacitor 16*b*. For convenience and ease of understanding, components on the left side of the drawing, having a similar or duplicate component on the right side, are given an "*a*" identification, and on the right side a "*b*" identification.

Coil 15*b* acts as an input primary coil for transformer 14*b* with passage of audio signals from the "*a*" side to the "*b*" side of transmission system 10 and on the other hand as an output secondary coil with passage of audio signals from the "*b*" side to the "*a*" side of transmission system 10. Coil 15*b* is wound on toroid transformer core 13*b* in the same manner as with coil 15*a* on transformer core 13*a*; and secondary or primary coil 12*b*, dependent upon the direction of audio signal flow, is wound on transformer core 13*b* in the same manner as coil 12*a* is wound on transformer core 13*a*. Coil 12*b* is connected for feeding therein induced audio signals to audio output/input circuit 11*b* for utilization as desired. When audio output/input circuit 11*b* is acting in reverse, it supplies an audio signal impressed on coil 12*b* as a primary input coil for reverse passage of audio signals.

It is an important design factor that capacitors 16*a* and 16*b* have negligible capacitive reactance compared to the inductive reactance of the respective choke coils 21*a* and 21*b*, in order to avoid resonance effects through the audio frequency range. This requires that the capacitors 16*a* and 16*b* be relatively large; for example, in a working embodiment as illustrated, capacitors 16*a* and 16*b* were 100 microfarad capacitors. Furthermore, coils 12*a* and 12*b*, and 15*a* and 15*b* must have sufficient coil turns to adequately support inductive transmission of sine wave audio signal voltages even at the lowest output audio frequency. Such a number of turns requirement may be derived from the following formula:

$$E=4.44B\ \text{max}\ ANf\times10^{-8}$$

where:

$E$=R.M.S. signal voltage
$B$ max=peak flux density in gausses
$A$=magnetic path cross section in square centimeters
$N$=number of turns
$f$=frequency in cycles per second
4.44=coefficient for sine wave R.M.S. input
$10^{-8}$=conversion factor from cgs. to mks. units.

A D.C. signal and/or control voltage circuit 18 is provided for feeding a D.C. signal and/or control voltage input through transformer coil 19*a* to the common junction of coil 15*a* and capacitor 16*a*, and through coil 15*a* to and through single conductor transmission line 17 for transmission of a signal from the left "*a*" side to the right "*b*" side of the system. On the "*b*" side of the system such D.C. signal and/or control voltages are passed through coil 15*b* to the common junction of coil 15*b* and capacitor 16*b*, and from this common junction through coil 19*b* to D.C. signal and/or control voltage utilizing circuitry 20. In combining such D.C. signal and/or control voltage (for example as a switching current) and an audio signal being passed through the single transmission line 17 of the system, any D.C. current passed must pass through each of the transformer coils 15*a* and 15*b*.

Since tape wound toroid cores are very susceptible to D.C. saturation and various other transformer magnetic circuits are susceptible to various levels of D.C. saturation, coils 15*a* and 19*a* are together bifilar wound on toroid transformer core 13*a* of transformer 14*a* with coil winding polarizations as dot indicated on the drawing. Coils 15*b* and 19*b* of transformer 14*b* are bifilar wound in like manner on toroid transformer core 13*b*. With this bifilar coil winding in each of the transformers, the current is the same through each bifilar wound coil and flowing in the opposite direction in one coil from the direction of current flow in the other coil. This provides a net electromagnetic cancellation effect and transformer inductively transmitted audio signals are not adversely affected by D.C. originated toroid transformer core saturation.

Obviously, other transformers having various other magnetic circuit configurations may be utilized in place of the toroid core transformers shown, with, however, the employment of bifilar type windings having appropriate coil polarization to minimize any D.C. derived magnetic circuit saturation to such negligible levels as to permit substantially unimpeded transformer transmission of audio signals.

It should be particularly noted that audio reactor coil windings 21*a* and 21*b*, shown, for example, to be wound on powdered iron ferromagnetic cores 22*a* and 22*b*, are required in the system. These give high impedance to the passage of audio signals from coil 19*a* to D.C. signal and/or control voltage circuit 18, and from coil 19*b* to D.C. signal and/or control voltage circuit 20, respectively. Were choke coils 21*a* and 21*b* not included, there would be excessive induction power pickup of audio signals in coils 19*a* and 19*b* and dissipation of audio signal power in the respective D.C. circuits 18 and 20.

The particular D.C. signal and/or control voltage circuit 18 is shown to have a normally open manually controlled switch 23 connected between ground and the base of NPN transistor 24. The emitter of NPN transistor 24 is connected to ground while the collector is connected through choke coil 21*a* to the coil 19*a* of transformer 14*a*. A positive voltage supply 25 of, in a working embodiment, between approximately 22 and 28 volts is connected through resistor 26 to the collector of transistor 24 and through a voltage divider including resistors 27, 28, and 29 to, from the junction of resistors 28 and 29, the base of NPN transistor 24. A capacitor 30 connected from the junction of resistors 27 and 28 to ground in cooperation with resistor 27, of the voltage divider, insures reduction to a negligible level of any audio signal originated components impressed on the base-to-emitter voltage of NPN transistor 24. Furthermore, choke coil 21*a* reduces residual ripple signal to a minimum level and substantially prevents any such ripple signal from being superimposed upon the audio signal being inductively transmitted through transformer 14*a*. On the "*b*" side of the system coil 19*b* of transformer 14*b* is connected through choke coil 21*b* to the base of NPN transistor 31. The emitter of NPN transistor 31 is connected to ground while the collector is connected through a relay coil 32 of a relay 33 to a positive voltage supply 34 which not only serves to supply relay actuating power but also collector biasing voltage power for NPN transistor 31. Relay 33 may have a drive connection 35 to audio output/input circuit 11*b*, as, for example, a push-to-talk actuating relay and/or for other D.C. signal controlled functions, as desired.

With reference to the D.C. switching operation with the D.C. signal and/or control circuits 18 and 20 in transmission system 10, transistor 24 is normally forward biased well into the saturation region so that the collector-to-emitter voltage of transistor 24, in the saturated state, is less than the base-to-emitter voltage of transistor 31, in the saturated state, with transistor 31 thereby being in the biased-off state. Manual closing of switch 23 effectively places the base-to-emitter voltage of NPN transistor 24 at zero volts thereby turning off transistor collector current. This results in the collector-to-emitter voltage of transistor 24 tending to rise toward the voltage of positive voltage supply 25. However, this rising action is limited since the base-to-emitter junction of NPN transistor 31 acts as a forwardly biased diode resting at an NPN transistor 24 collector-to-emitter voltage value equal to an NPN transistor 31 base-to-emitter voltage in the saturated state with transistor 31 being thereupon turned on. This results in relay coil 32, in series with the collector-emitter circuit to voltage supply 34, being activated and relay 33 being energized.

Components and values used in a working single conductor audio frequency signal and D.C. switching transmission system according to the invention as shown in the drawing, include the following:

| | |
|---|---|
| Coils 12*a* and 12*b* | 200 turns No. 32 wire. |
| Coils 15*a*, 15*b*, 19*a*, and 19*b* | 20 turns No. 32 wire. |
| Capacitors 16*a* and 16*b* | 100 microfarads. |
| Choke coils 21*a* and 21*b* | 200 turns No. 32 wire on ferro-magnetic cores. |
| NPN transistors 24 and 31 | 2N2270. |
| Voltage supplies 25 and 34 | +22 to 28 volts D.C. |
| Resistor 26 | 3.3K ohms. |
| Resistors 27 and 28 | 1.5K ohms. |
| Resistor 29 | 330 ohms. |
| Capacitor 30 | 22 microfarads. |

Whereas this invention is here illustrated and described with respect to a specific embodiment thereof, it should be realized that various changes may be made without departing from the essential contribution to the art made by the teachings hereof.

I claim:

1. In a signal combining, conveying, and then signal separating system having a common voltage potential reference source and with conductor transmission line means interconnecting two electronic component stations: a conductor transmission line; audio signal transmitting transformers in each of said electronic component stations; each of said transformers including a first coil winding connected to audio circuit means; a second coil winding of each transformer being interconnected at the corresponding ends through said conductor transmission line; each other end of said second coil windings being connected through a capacitor to the voltage potential reference source; D.C. circuit means at each of said electronic component stations; each transformer being provided with a third coil winding; each of said D.C. circuit means being connected through said third coil winding of the respective transformer to the common junction of said second coil and said capacitor of each station; and with said second and third coil windings of each transformer having such polarization that D.C. current flow through the second coil winding is opposite in direction to D.C. current flow through the companion third coil winding.

2. The signal combining, conveying, and then separating system of claim 1, wherein said second and third coil windings are bifilar wound in each of said transformers.

3. The signal combining, conveying, and then separating system of claim 2, wherein said second and third coil windings have substantially the same number of turns.

4. The signal combining, conveying, and then signal separating system of claim 1, wherein a choke coil is provided in the connections between the respective D.C. circuits and said third coil of each respective transformer.

5. The signal combining, conveying, and then signal separating system of claim 1, wherein said transformers are toroid core type transformers.

6. The signal combining, conveying, and then signal separating system of claim 1, wherein said audio circuit means of one of said electronic component stations is an audio input circuit connected to said first coil winding as a primary coil of the audio signal transmitting transformer of that electronic component station; the audio circuit means of the other electronic component station being an audio output circuit connected to a said first coil winding as a secondary audio output coil winding of the audio signal transmitting transformer of the other electronic component station; and with said conductor transmission line being a single conductor transmission line interconnecting an end of one of said second coil windings with the corresponding end of the other of said second coil windings.

7. The signal combining, conveying, and then signal separating system of claim 6, wherein the D.C. circuit means of one of said electronic component stations includes D.C. signal generating means; and said D.C. circuit means of the other electronic component station includes D.C. signal utilizing circuitry.

8. The signal combining, conveying, and then signal separating system of claim 7, wherein each of said audio circuit means are combination audio input and audio output circuits.

References Cited

UNITED STATES PATENTS

| | | | |
|---|---|---|---|
| 942,208 | 12/1909 | Kitsee | 178—58 |
| 1,251,208 | 12/1917 | Ferriter | 178—59 |

JOHN W. CALDWELL, *Primary Examiner.*

J. T. STRATMAN, *Assistant Examiner.*